US008165014B2

(12) United States Patent
Brooks et al.

(10) Patent No.: US 8,165,014 B2
(45) Date of Patent: Apr. 24, 2012

(54) METHODS AND SYSTEMS FOR USING MANAGED PORT CIRCUITRY TO MAP CONNECTIONS AMONG STRUCTURED CABLING APPARATUS AND NETWORK DEVICES

(75) Inventors: George Brooks, Allen, TX (US); Jeffrey Sumrall, Pearland, TX (US); Terry Cobb, Plano, TX (US); G. Mabud Choudhury, Warren, NJ (US); Ryan Enge, Dallas, TX (US)

(73) Assignee: Commscope, Inc. of North Carolina, Hickory, NC (US)

( * ) Notice: Subject to any disclaimer, the term of this patent is extended or adjusted under 35 U.S.C. 154(b) by 301 days.

(21) Appl. No.: 12/142,542

(22) Filed: Jun. 19, 2008

(65) Prior Publication Data

US 2008/0316940 A1  Dec. 25, 2008

Related U.S. Application Data

(60) Provisional application No. 60/944,989, filed on Jun. 19, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/218; 370/219; 370/220; 370/225; 370/228; 370/245; 370/248; 370/355; 370/357; 379/29.04; 379/29.08

(58) Field of Classification Search .................. 370/245, 370/248, 254, 256, 285, 355, 357, 218–220, 370/225, 228; 379/29.04, 29.08, 32.01, 92.01, 379/442; 710/312; 714/25, 36–37, 47.1; 398/1–3, 10, 12, 55–57
See application file for complete search history.

(56) References Cited

U.S. PATENT DOCUMENTS 4,807,121 A * 2/1989 Halford ........................... 710/53
(Continued)

FOREIGN PATENT DOCUMENTS

EP    1 357 703 A2    10/2003
(Continued)

OTHER PUBLICATIONS

International Search Report and Written Opinion (17 pages) corresponding to International Application No. PCT/US2008/007616; Mailing Date: May 12, 2008.

*Primary Examiner* — Aung S Moe
*Assistant Examiner* — Benjamin H Elliott, IV
(74) *Attorney, Agent, or Firm* — Myers Bigel Sibley & Sajovec, P.A.

(57) ABSTRACT

A managed port circuit includes a detection circuit that is disposed in a communication channel between a first local port and a second local port and a controller that is coupled to the detection circuit and is operable to configure the detection circuit in a detection configuration in which the first and second local ports are connected to the controller and a second pass through configuration in which the first and second local ports are connected to each other via the communication channel, the controller being further operable to determine when an end device is connected to one of the first and second local ports when the detection circuit is in the detection configuration.

59 Claims, 6 Drawing Sheets

U.S. PATENT DOCUMENTS

| | | | |
|---|---|---|---|
| 4,939,777 A * | 7/1990 | Oka | 379/387.01 |
| 5,297,138 A * | 3/1994 | Black | 370/254 |
| 5,311,170 A * | 5/1994 | Wachi et al. | 340/2.9 |
| 5,394,503 A * | 2/1995 | Dietz et al. | 385/135 |
| 5,483,467 A * | 1/1996 | Krupka et al. | 709/200 |
| 5,568,525 A * | 10/1996 | de Nijs et al. | 375/356 |
| 5,625,621 A * | 4/1997 | Christensen et al. | 370/248 |
| 5,703,872 A * | 12/1997 | Boggs et al. | 370/252 |
| 5,825,775 A * | 10/1998 | Chin et al. | 370/401 |
| 5,832,244 A * | 11/1998 | Jolley et al. | 710/305 |
| 5,878,232 A * | 3/1999 | Marimuthu | 709/249 |
| 5,887,193 A * | 3/1999 | Takahashi et al. | 710/8 |
| 6,047,321 A * | 4/2000 | Raab et al. | 709/224 |
| 6,222,908 B1 | 4/2001 | Bartolutti et al. | |
| 6,226,269 B1 * | 5/2001 | Brewer et al. | 370/245 |
| 6,671,750 B2 | 12/2003 | Nakamura | 710/18 |
| 6,975,209 B2 * | 12/2005 | Gromov | 375/258 |
| 7,054,272 B1 * | 5/2006 | Noel et al. | 370/241 |
| 7,124,220 B2 * | 10/2006 | James et al. | 710/104 |
| 7,193,422 B2 * | 3/2007 | Velleca et al. | 324/538 |
| 7,225,052 B2 | 5/2007 | Foote et al. | |
| 7,369,513 B1 * | 5/2008 | Sankaran | 370/256 |
| 7,768,418 B2 * | 8/2010 | Nordin | 340/687 |
| 7,811,119 B2 * | 10/2010 | Caveney et al. | 439/489 |
| 7,978,845 B2 * | 7/2011 | Caveney et al. | 379/413 |
| 7,983,192 B2 * | 7/2011 | Ghaibeh et al. | 370/254 |
| 2002/0120773 A1 * | 8/2002 | Caveney | 709/245 |
| 2003/0147385 A1 * | 8/2003 | Montalvo et al. | 370/389 |
| 2004/0057660 A1 * | 3/2004 | Jablonski | 385/24 |
| 2004/0068589 A1 * | 4/2004 | Witkowski et al. | 709/249 |
| 2004/0073597 A1 | 4/2004 | Caveney et al. | |
| 2005/0030955 A1 * | 2/2005 | Galin et al. | 370/401 |
| 2005/0111491 A1 | 5/2005 | Caveney | |
| 2005/0186819 A1 | 8/2005 | Velleca et al. | |
| 2006/0000917 A1 * | 1/2006 | Kim et al. | 235/492 |
| 2006/0185877 A1 | 8/2006 | Soffer | |
| 2006/0233186 A1 * | 10/2006 | Portolani et al. | 370/408 |
| 2006/0239183 A1 * | 10/2006 | Robitaille et al. | 370/217 |
| 2006/0279398 A1 * | 12/2006 | Wang | 340/3.42 |
| 2006/0282529 A1 * | 12/2006 | Nordin | 709/224 |
| 2007/0132503 A1 * | 6/2007 | Nordin | 327/518 |
| 2007/0280288 A1 * | 12/2007 | Ma | 370/467 |
| 2007/0286411 A1 * | 12/2007 | King et al. | 379/442 |
| 2008/0133945 A1 * | 6/2008 | Biederman et al. | 713/300 |
| 2008/0214140 A1 * | 9/2008 | Caveney et al. | 455/402 |
| 2008/0253556 A1 * | 10/2008 | Cobb et al. | 379/442 |
| 2008/0265994 A1 * | 10/2008 | Nakatani et al. | 330/278 |
| 2008/0316940 A1 * | 12/2008 | Brooks et al. | 370/254 |
| 2009/0178119 A1 * | 7/2009 | Macauley | 726/4 |

FOREIGN PATENT DOCUMENTS

| | | |
|---|---|---|
| EP | 1 357 703 A3 | 10/2003 |
| EP | 1 734 692 A1 | 12/2006 |
| WO | WO 02/069565 A2 | 9/2002 |
| WO | WO 02/069565 A3 | 9/2002 |

* cited by examiner

METHODS AND SYSTEMS FOR USING MANAGED PORT CIRCUITRY TO MAP CONNECTIONS AMONG STRUCTURED CABLING APPARATUS AND NETWORK DEVICES

CROSS-REFERENCE TO RELATED APPLICATION

This application claims the benefit of U.S. Provisional Patent Application No. 60/944,989, filed Jun. 19, 2007 in the U.S. Patent and Trademark Office, the disclosure of which is incorporated herein in its entirety by reference.

BACKGROUND

The present invention relates to systems, methods, and computer program products for managing a structured cabling system and, more particularly, to systems, methods, and computer program products for managing a structured cabling system by integrating layer-one cabling apparatus with layer-two and above infrastructure.

Historically structured cabling apparatus has been considered an Open Systems Interconnection (OSI) layer-one physical entity that does not provide a manageable presence on a Local Area Network (LAN) that has a management system associated therewith. Thus, structured cabling apparatus may be invisible in terms of LAN management. Without having real-time port-to-port connectivity data from switch device to structured cabling apparatus to desktop or server device, it may be difficult to dynamically monitor or track moves, adds, and/or changes involving these specific devices. Moreover, patching mistakes may often occur between a patch panel and the end device.

Also, over a period of time, labeling schemes may become obsolete if static records are not very well maintained. Any significant infrastructure or personnel change can heavily impact the accuracy of static connectivity and asset records. In large data centers and LAN environments where network equipment (servers, switches, etc.) is frequently upgraded, moved, and/or reallocated, any slight change in the patching or labeling scheme following a modification can cause delays in troubleshooting and temporary downtime for an associated network resource. Patching consistency may be particular important in the case of Virtual LAN (VLAN) switching because devices are no longer tied to sub-networks by hardware, but instead are logically joined to subnets in software. For instance, if an application server that is being used in VLAN1 is mistakenly patched via a VLAN2 port, communication-wise that resource will then become unavailable to all users. Its entire connectivity link may then be physically mapped for accuracy and in a very large data center installation this can be very time consuming.

In addition to labeling schemes, enterprises may also wish to manage their assets that are connected to their networks by keeping track of any adds, moves, and/or changes associated with the assets. Asset management has traditionally relied on the integrity of the patching and/or labeling schemes, but, as discussed above, the accuracy of such schemes can be compromised over time.

SUMMARY

In some embodiments of the present invention, a managed port circuit includes a detection circuit that is disposed in a communication channel between a first local port and a second local port and a controller that is coupled to the detection circuit and is operable to configure the detection circuit in a detection configuration in which the first and second local ports are connected to the controller and a second pass through configuration in which the first and second local ports are connected to each other via the communication channel, the controller being further operable to determine when an end device is connected to one of the first and second local ports when the detection circuit is in the detection configuration.

In other embodiments, the managed port circuit further includes an interface circuit that connects the detection circuit to the controller and is operable to report end device connections to the first and second local ports to the controller.

In still other embodiments, the managed port circuit further includes a disconnection detection circuit that is connected between the controller and the first and second local ports and is operable to report end device disconnections from the first and second local ports to the controller.

In still other embodiments, the disconnection detection circuit is a differential current sense or voltage sense amplifier circuit.

In still other embodiments, the detection circuit includes an electrical relay circuit, an analog switch Integrated Circuit (IC), an optical relay circuit, and/or an electromechanical switch circuit.

In still other embodiments, the detection circuit includes a network switch Integrated Circuit (IC).

In still other embodiments, the first and second local ports are part of a Virtual Local Area Network (VLAN).

In still other embodiments, the controller is further operable to determine a type of end device connected to one of the first and second local ports, a port number for the first or second local port that the end device is connected to, a port number on the end device that the first or second local port is connected to, a physical location of the first or second local poll that the end device is connected to on a local device that is associated with the managed port circuit, a physical location of the local device, connection status of the end device, and/or a Medium Access Control (MAC) address associated with the end device.

In still other embodiments, the type of end device includes a patch panel, a zone/cp box, a wall outlet, Data Terminal Equipment (DTE) and/or a network bridge device.

In still other embodiments, the network bridge device comprises a network switch, router, and/or hub.

In still other embodiments, the controller is further operable to determine the type of end device by transmitting Port Info packets during an end device detection time interval and determining if a Port Info Response packet is received and/or a Port Info packet is received.

In still other embodiments, the controller is further operable to determine that the end device type is a wall outlet or patch panel when a Port Info packet or Port Info Response packet is received.

In still other embodiments, the controller is further operable to determine the type of end device by determining if a Spanning Tree packet is received and/or an Ethernet packet is received other than a Spanning Tree packet.

In still other embodiments, the controller is further operable to determine that the end device is a network bridge device if the Spanning Tree packet is received.

In still other embodiments, the Spanning Tree packet comprises a Spanning Tree Protocol (STP) packet, Rapid Spanning Tree Protocol (RSTP) packet, Multiple Spanning Tree Protocol (MSTP) packet, Per-VLAN Spanning Tree (PVST) protocol packet, and/or Rapid Per-VLAN Spanning Tree (R-PVST) protocol packet.

In still other embodiments, the controller is further operable to configure the detection circuit in the pass through configuration after determining the types of devices connected to the first and second local ports.

In still other embodiments, the controller is further configured to communicate the type of end device connected to one of the first and second local ports, the port number for the first or second local port that the end device is connected to, the physical location of the first or second local port that the end device is connected to on a local device that is associated with the managed port circuit, the physical location of the local device, connection status of the end device, and/or the Medium Access Control (MAC) address associated with the end device to a network monitoring system.

In still other embodiments, the detection circuit is disposed in a patch panel, zone/cp box, or wall outlet.

In still other embodiments, the controller is disposed in the patch panel, zone/cp box, or wall outlet.

In still other embodiments, a communication medium connecting the end device to one of the first and second local ports lacks a dedicated connectivity control channel.

In still other embodiments, the communication channel is an electrical cable including four wire pairs.

In still other embodiments, the communication channel includes a plurality of optical fibers.

In further embodiments of the present invention, a network management system includes a managed port circuit that is coupled to a communication channel between a first local port and a second local port, the managed port circuit being operable to determine when an end device is connected to one of the first and the second local ports, to determine an end device type, to determine a port number for the first or second local port that the end device is connected to, to determine a port number on the end device that the first or second local port is connected to, to determine a physical location of the first or second local port that the end device is connected to on a local device that is associated with the managed port circuit, to determine a physical location of the local device, and/or to determine a Medium Access Control (MAC) address associated with the end device, and a network monitoring system that is configured to obtain the end device type, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address from the managed port circuit and to store the end device type, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address in a data storage repository.

In still further embodiments, the network monitoring system is configured to obtain the end device type, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address from the managed port circuit using a Simple Network Management Protocol (SNMP), SOAP, WBEM, and/or a proprietary network protocol.

In still further embodiments, the network monitoring system is further configured to generate a connectivity map of the network based on the end device type, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address information stored in the data storage repository.

In still further embodiments, the end device is a first end device and the network monitoring system is further configured to obtain connectivity and/or type information for a second end device in the network from a source other than the managed port circuit, to store the connectivity and/or type information for the second end device in the data storage repository, and to generate the connectivity map based on the first end device type, the port number for the first or second local port that the first end device is connected to, the port number on the first end device that the first or second local port is connected to, the physical location of the first or second local port that the end device is connected to on a local device that is associated with the managed port circuit, the physical location of the local device, connection status of the end device, and/or the MAC address information for the first end device stored in the data storage repository and the connectivity and/or type information for the second end device.

In still further embodiments, the source for the connectivity and/or type information for the second end device is a user of the network management system.

In still further embodiments, the network monitoring system is further configured to track modifications to the network based on the end device type, connection status of the end device, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address information stored in the data storage repository.

In still further embodiments, the network monitoring system is further configured to audit equipment in the network based on the end device type, connection status of the end device, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address information stored in the data storage repository.

In still further embodiments, the network monitoring system is further configured to troubleshoot network errors based on the end device type, connection status of the end device, the port number for the first or second local port that the end device is connected to, the port number on the end device that the first or second local port is connected to, the physical location of the first or second local port that the end device is connected to on a local device that is associated with the managed port circuit, the physical location of the local device, connection status of the end device, and/or the MAC address information stored in the data storage repository.

In still further embodiments, the managed port circuit comprises a controller that is connected between the network management system and the communication channel and the network management system is further configured to communicate with the controller via the communication channel.

In still further embodiments, the managed port circuit is configured to transmit packet traffic from the first and the second ports and the network monitoring system is further configured to communicate with the end device to determine a local device type associated with the managed port circuit and/or a port number for the first or second local port that the end device is connected to based on at least a portion of the transmitted packet traffic recorded at the end device.

In still further embodiments, the transmitted packet traffic includes Port Info packets.

In still further embodiments, at least a portion of the managed poll circuit is disposed in a patch panel, zone/cp box, or wall outlet.

In still other embodiments of the present invention, a managed port circuit includes a detection circuit that is connected in series in a communication channel between a first local port and a second local port and a controller that is coupled to the detection circuit and is operable to monitor traffic on the communication channel and to determine when an end device is connected to one of the first and second local ports.

Although described above primarily with respect to apparatus and/or device aspects of the present invention, it will be understood that the present invention may be embodied as electronic devices/apparatus, methods, systems, and/or computer program products.

DETAILED DESCRIPTION

Figure 1:
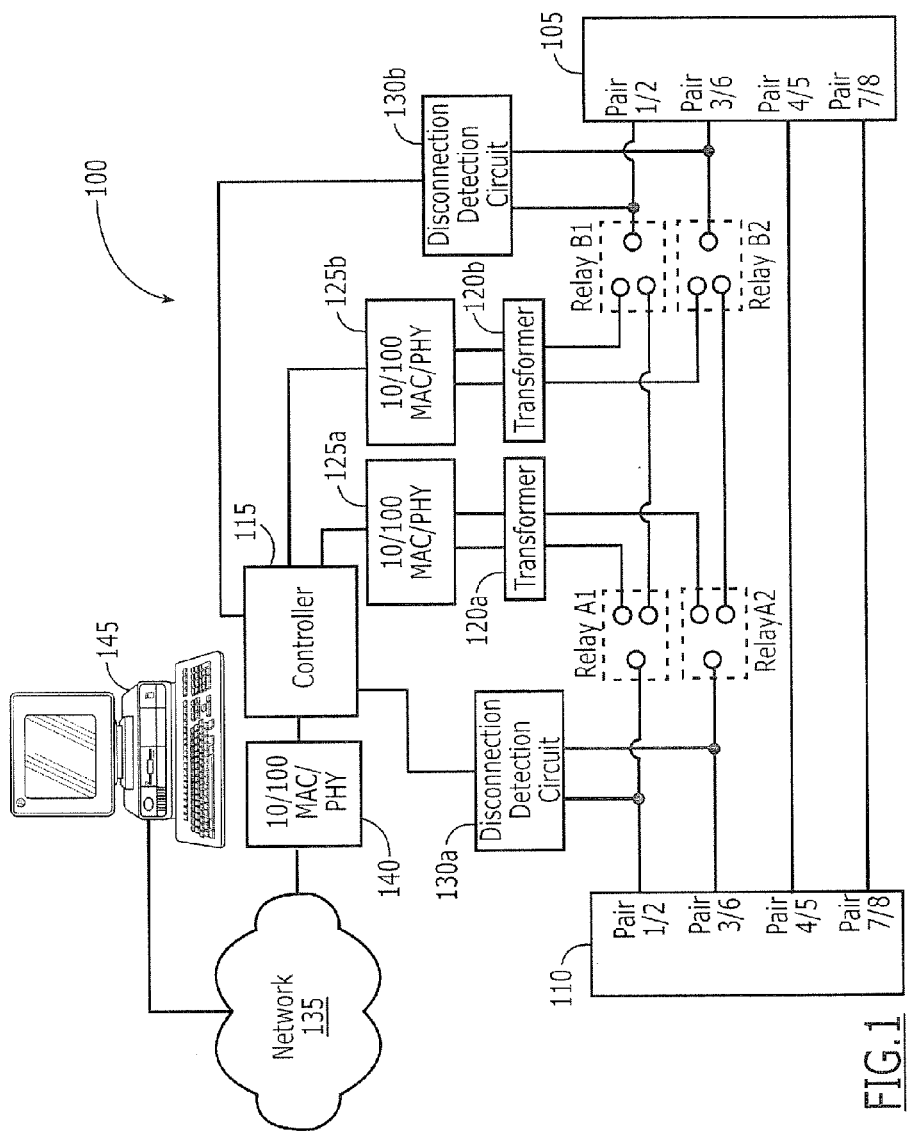
FIG. 1 is a block diagram of a communication network that includes managed port circuitry in accordance with some embodiments of the present invention.

Embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention may provide a communication network in which managed port circuitry is added to structured cabling apparatus including, for example, layer-one devices, such as patch panels, zone/cp boxes, wall outlets, and the like. Moreover, the managed port circuitry may be used with other managed network devices, such as switches, routers, hubs, and the like to provide real-time port-to-port mapping and monitoring. The managed port circuitry may communicate with, for example, a Simple Network Management Protocol (SNMP) based network monitoring system that can dynamically associate a port in one device with a port in another device. These associations may be communicated to other network management systems or stored in a database. The database may be queried and the data extracted therefrom to construct connectivity maps between devices in the network. Furthermore, physical location information can be combined with connectivity information to create or update a physical connectivity map. These maps may provide detailed connectivity information, such as specific device/port connections as well as higher level sub-network views. Because managed devices, such as switches, routers, hubs, and the like typically publish Management Information Base (MIB) data, this information can be combined with the port/device data obtained for the layer-one structured cabling apparatus to provide a more complete view of the network from a port perspective. The database containing the port associations for the various devices in the network may also be used for various accounting and auditing functions associated with moves, adds, and/or changes in the network. Other applications for the port association database may include troubleshooting and support functionality. For example, connectivity maps may be superimposed onto building floor plans or data center schematics in an automated fashion.

Embodiments of the present invention may allow determinations of whether an end device is connected to a local device that includes managed port circuitry and the type of end device that is connected without the use of a dedicated connectivity control channel on the communication medium connecting the end device to the local device. By contrast, conventional end device connection systems may use custom cabling in which a control channel is dedicated for device detection/continuity determinations. Embodiments of the present invention may provide for end device detection and type determination while using conventional telecommunication/data communication cabling, such as TIA-568 cables that contain four wire pairs and/or optical cabling.

Embodiments of the present invention are described herein by way of example with reference to a layer-one structured cabling apparatus being a patch panel. It will be understood that the present invention is not limited to such embodiments as the layer-one structured cabling apparatus may be other types of devices including, but not limited to, zone/cp boxes, wall outlets, and the like. Moreover, embodiments of the present invention are described herein with respect to copper transmission media. The present invention is not limited to any particular type of transmission media. Other types of media, such as fiber optical cables, relays, transceivers, hybrids of multiple types of media, etc. may be used in accordance with various embodiments of the present invention.

Embodiments of the present invention are also described herein in the context of processing a packet. It will be understood that the term "packet" means a unit of information and/or a block of data that may be transmitted electronically as a whole or via segments from one device to another. Accordingly, as used herein, the term "packet" may encompass such terms of art as "cell," "frame," and/or "message," which may also be used to refer to a unit of transmission.

Referring to FIG. 1, a communication network 100 includes a layer-one, structured cabling apparatus or device, such as a patch panel, in which a plurality of channels are defined between patch cord terminations, such as RJ45 connector ports on one side of the panel and cable terminations, such as Insulation Displacement Contacts (IDC) on the other side of the panel. Embodiments of the present invention are not limited to RJ45 and IDC connector types. Other types of patch cord and cable termination connections may be used in accordance with various embodiments of the present invention. Moreover, the RJ45 connections on one side of a patch panel are typically called ports and the IDC connections on the other side of a patch panel are typically called terminations. Because embodiments of the present invention are not limited to a particular type of device or apparatus, such as a patch panel, the connection points at the two ends of the communication channel on the local device are referred to generally as ports or local ports so as to distinguish these ports from ports on other end devices.

FIG. 1 illustrates one such channel defined between local ports 105 and 110. Ports 105 may comprise, for example, an RJ45 ports and ports 110 may comprise, for example, IDC terminations on a patch panel. In accordance with various embodiments of the present invention, the communication channel between local ports 105 and 110 may be an electrical cable (e.g., a patch cord) that comprises four wire pairs, such as that defined by the TIA 568 standard or the communication channel may be an optical cable that comprises a plurality of optical fibers, which may be single mode and/or multi-mode fibers. The communication network 100 further includes managed port circuitry that can be used to detect connections to the ports 105 and 110 and to identify the types of devices that are connected thereto. The managed port circuitry includes electrical relay circuits A1, A2, B1, and B2 that are placed in the channel path between local ports 105 and 110. The relay circuits A1, A2, B1, and B2 are connected to a controller 115 via transformer circuits 120a and 120b and the Medium Access Control (MAC)/PHY interfaces 125a and 125b. The relay circuits A1, A2, B1, and B2 are operable via the controller 115 to connect the local ports 105 and 110 to each other (pass through configuration) or to the controller 115. In accordance with various embodiments of the present invention, the relay circuits A1, A2, B1, and B2 may be replaced with other types of switches, such as electromechanical circuits, optical relay circuits and/or analog Integrated Circuit (IC) switch circuits that provide acceptable channel performance when configured in a pass through configuration.

Disconnection detection circuits 130a and 130b are also provided between the controller 115 and the channel path. The disconnection detection circuits 130a and 130b are operable to detect the absence of data activity on the channel path. In some embodiments of the present invention, the disconnection detection circuits 130a and 130b may be op-amp based differential current sense and/or voltage sense circuits.

The controller 115 may be a commercially available or custom microprocessor that is configured to execute the state machines described below to detect connections to the local ports 105 and 110 and identify the types of devices that are connected thereto. The controller 115 is further connected to a network 135 via a MAC/PHY interface 140. The network 135 may be a global network, such as the Internet or other publicly accessible network. Various elements of the network may be interconnected by a wide area network, a local area network, an Intranet, and/or other private network, which may not be accessible by the general public. Thus, the network 135 may represent a public network, a combination of public and private networks, or a virtual private network (VPN).

As shown in FIG. 1, the controller 115 may communicate with a Simple Network Management Protocol (SNMP) based network monitoring system 145 via the network 135. SNMP is an example network management protocol that the network monitoring system 145 may use to communicate with the controller 115. Embodiments of the present invention are not limited to SNMP, however, as other network management protocols, including, but not limited to SOAP, WBEM, proprietary network protocols, and the like may be used in accordance with various embodiments of the present invention. The network monitoring system 145 may be configured to collect port/device connectivity information along with device type information from the controller 115. This information may be stored in a database, which can be queried to construct port/device connectivity maps of the network 100. Moreover, the database may be used for other applications, such as tracking moves, adds, and/or changes in the network 100, auditing and accounting functions, and/or troubleshooting/support functionality as described above.

In accordance with various embodiments of the present invention, the elements of the managed port circuitry of FIG. 1 can be located in various places. For example, in some embodiments, the detection components including the relay circuits A1, A2, B1, and B2, transformer circuits 120a and 120b, disconnection detection circuits 130a and 130b, and PHY circuits 125a and 125b may be disposed in a patch panel, zone/cp box, or wall outlet with the controller 115 disposed in a location remote from the patch panel, zone cp box, or wall outlet. In other embodiments, the controller 115 may be co-located with the other detection components in the patch panel, zone/cp box, or wall outlet.

Although FIG. 1 illustrates an exemplary communication network, it will be understood that the present invention is not limited to such configurations, but is intended to encompass any configuration capable of carrying out the operations described herein.

Figure 2:
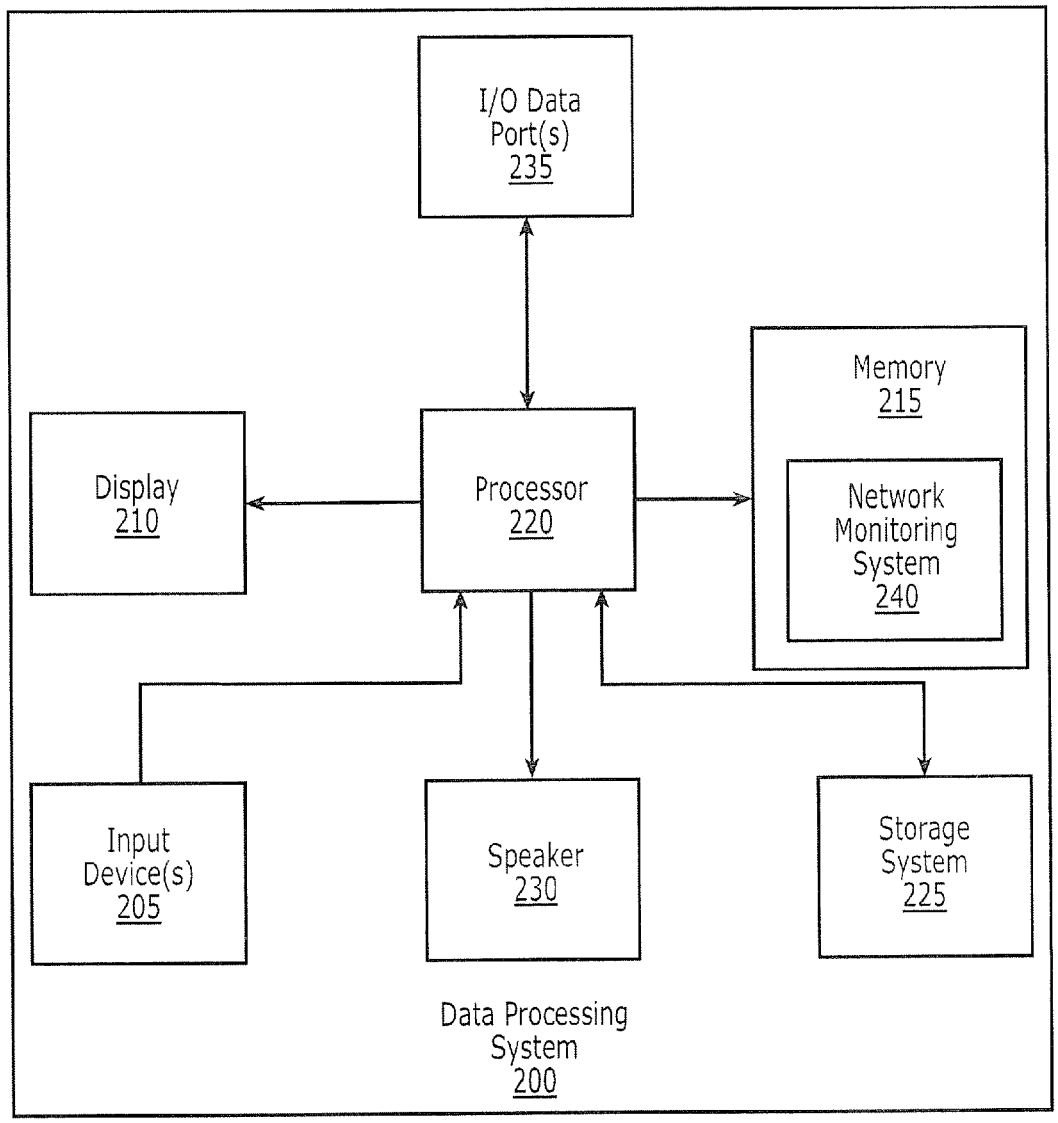
FIG. 2 is a block diagram that illustrates a data processing system in accordance with some embodiments of the present invention.

FIG. 2 illustrates a data processing system 200 that may be used, for example, to implement the network monitoring system 145 of FIG. 1, in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a network monitoring system module 240 that may be an SNMP based software module that is capable of communicating with the controller 115 of FIG. 1 to obtain port/device connectivity and type information from a communication network and to populate a database with the data for use in constructing connectivity maps and supporting other applications, such as tracking moves, adds, and/or changes in the network 100, auditing and accounting functions, and/or troubleshooting/support functions.

Figure 3:
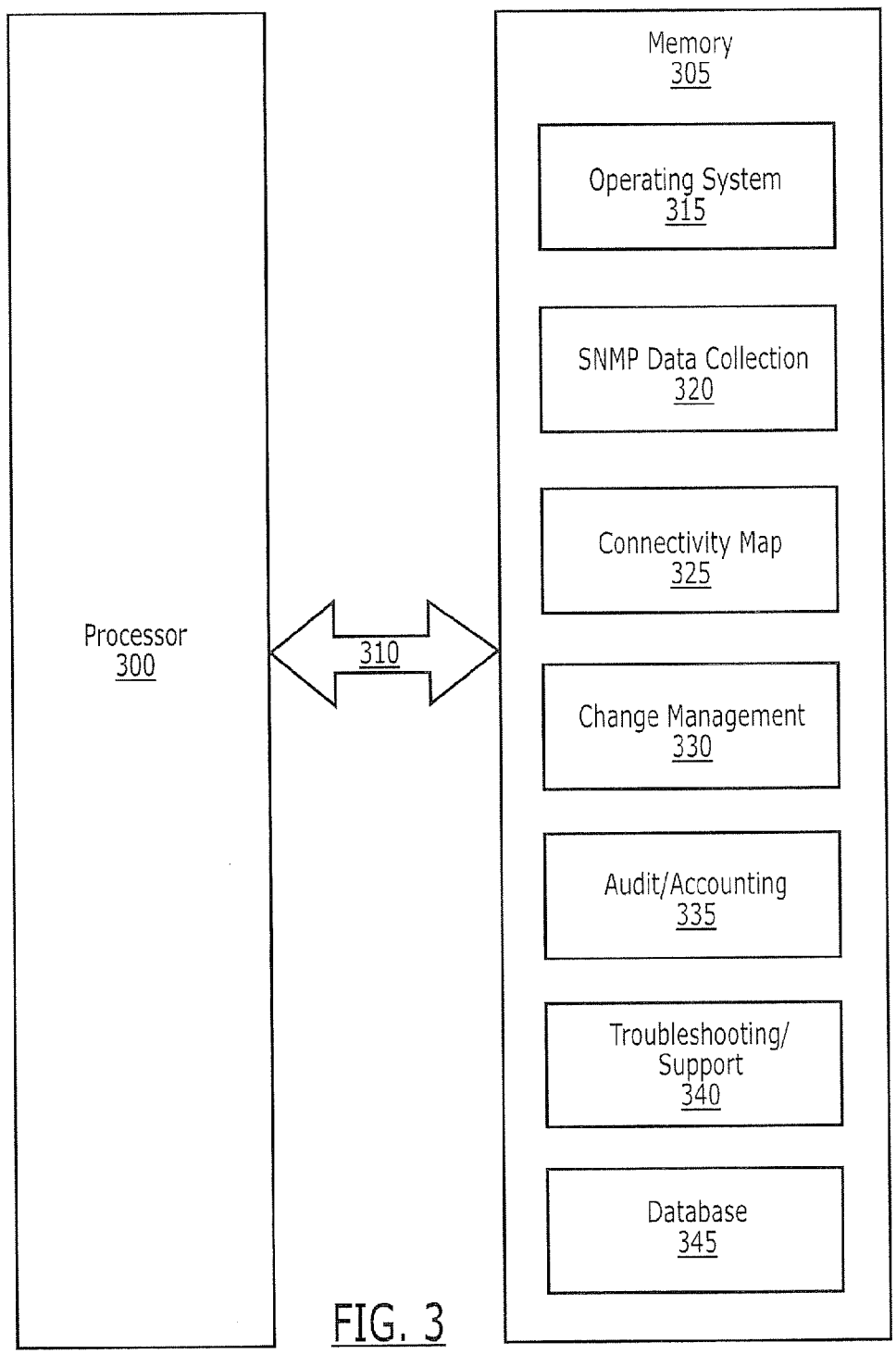
FIG. 3 is a block diagram that illustrates a software/hardware architecture for monitoring a communication network in accordance with some embodiments of the present invention.

FIG. 3 illustrates a processor 300 and memory 305 that may be used in embodiments of data processing systems, such as the data processing system 200 of FIG. 2 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to collect and manage port/device connectivity and identity information in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to seven or more categories of software and/or data: an operating system 315, an SNMP data collection module 320, a connectivity map module 325, a change management module 330, an audit/accounting module 335, a troubleshooting/support module 340, and a database module 345. The operating system 315 generally controls the operation of the data processing system. In particular, the operating system 315 may manage the data processing system's software and/or hardware resources and may coordinate execution of programs by the processor 300. The SNMP data collection module 320 may be configured to obtain port connectivity information and device identity information from the controller 115 of FIG. 1. The port connectivity information and device identity information may be stored in the database 345. The connectivity map module 325 may be configured to query the database 345 to obtain the associations between ports and devices in the network and to construct a connectivity map of the network based on these associations. In addition to the device type and connectivity information obtained via the managed port circuitry of FIG. 1, the connectivity map module 325 may also use device type and/or connectivity information input via a user or provided from another alternative source. The change management module 330 may be configured to track moves, adds, and/or changes in the network based on the port connectivity and device identity information stored in the database 345. The audit/accounting module 335 may be configured to provide audit/accounting functions based on the port connectivity and device identity information stored in the database 345. The troubleshooting/support module 340 may be configured to cooperate with the connectivity map module 325 to provide troubleshooting/support tools to address problems in a network. For example, connectivity maps may be superimposed onto floor plans or data center schematics to assist technicians in resolving problems. In other embodiments, the troubleshooting/support module 340 may cooperate with diagnostic tools to isolate problems in the network. For example, as shown in FIG. 1, it is possible to communicate with both end devices and the controller 115 via the communication channel. The troubleshooting/support module 340 may cooperate with a diagnostic tool to communicate with the controller 115 to determine if there is continuity on the channel. The ability to communicate with the controller 115 may indicate that the communication channel is working properly and allow a technician to narrow the number of potential causes of a problem.

Although FIG. 3 illustrates exemplary hardware/software architectures that may be used in data processing systems, such as the data processing system 200 of FIG. 2, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), FPGAs, PLDs, CPLDs, and/or a programmed digital signal processor or microcontroller.

Figure 4:
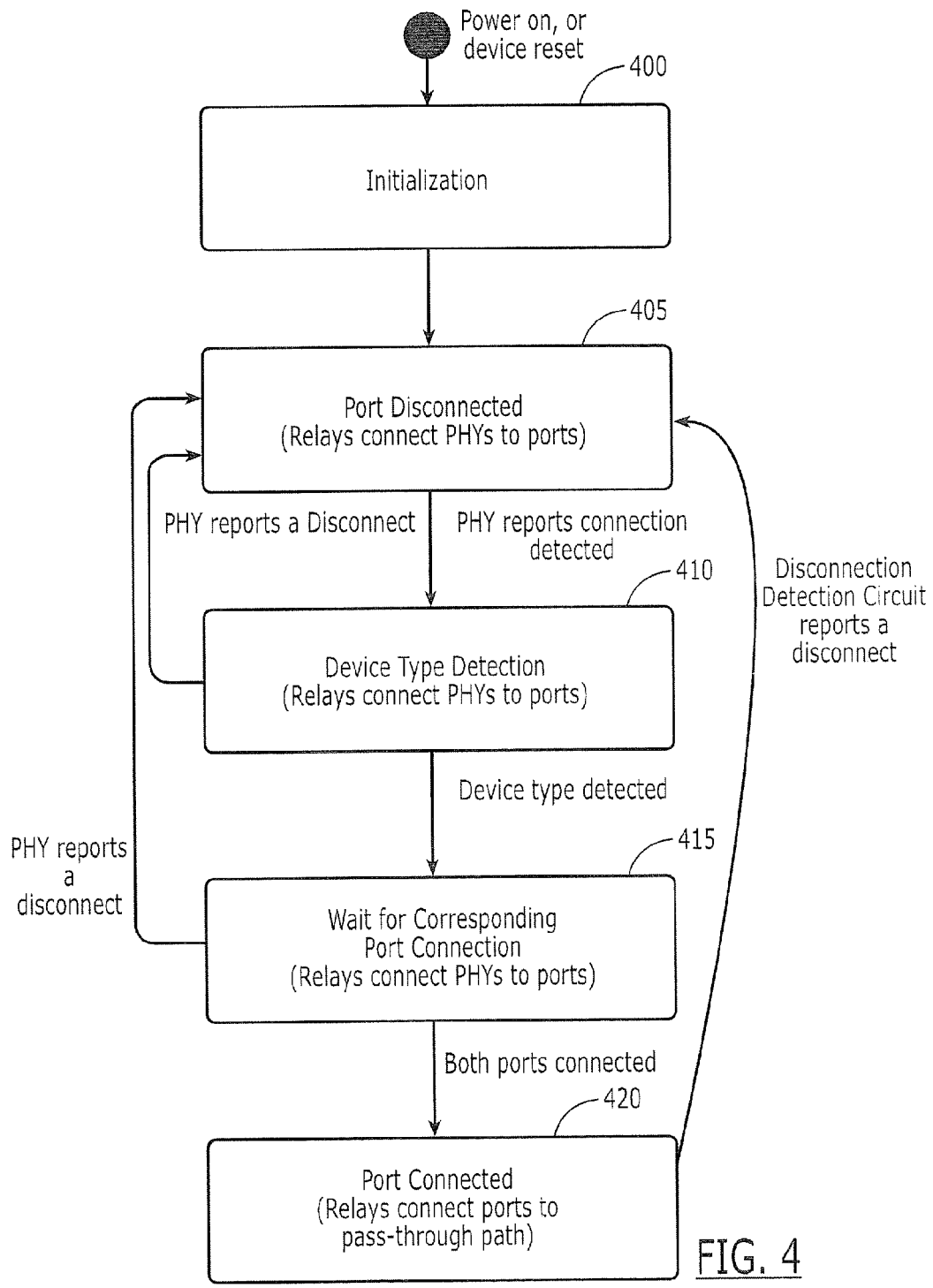
FIGS. 4 and 5 are state machine diagrams for detecting device connections to structured cabling apparatus and determining the device type, respectively, in accordance with some embodiments of the present invention.

FIG. 4 illustrates a state machine that is implemented by the controller 115 of FIG. 1 to detect connections to ports 105 and 110 of the layer-one structured cabling apparatus or device including managed port circuitry of FIG. 1 in accordance with some embodiments of the present invention. An instance of the state machine is launched for each local port pair (e.g., 105/110 of FIG. 1) on the structured cabling apparatus or device. As shown in FIG. 4, the state machine initializes at block 400 after a power-on or device reset event. The relays A1, A2, B1, and B2 are configured to connect the local ports 105, 110 to the controller 115 at block 405. When the controller 115 detects a connection to one of the local ports 105, 110 via the PHY interfaces 125a, 125b the state machine transitions to block 410 where the controller 115 determines what type of end device is connected to the local port. The end device may be a variety of different types in accordance with various embodiments of the present invention, such as Digital Terminal Equipment (DTE), a patch panel, wall outlet, switch, hub, router, etc. Methods of determining the end device type are described below with reference to FIG. 5. Once the end device type is detected, the connected to local port number, the port number on the end device that the local port is connected to, and/or the Medium Access Control (MAC) address of the end device may be communicated from the controller 115 to the network monitoring system 145. Once the end device type is determined, the state machine transitions to block 415 to wait for the other corresponding local port 105 or 110 on the structured cabling apparatus or device to be connected. Once both local ports are connected, the state machine transitions to block 420 where the controller 115 configures the relays A1, A2, B1, and B2 in a pass through configuration such that the channel connects the two local ports 105 and 110. As shown in FIG. 4 if the PHY circuits 125a and 125b detect a disconnection at any time during states 410 or 415 or the disconnection detection circuit 130a or 130b detects a disconnection at any time during state 420, the state machine transitions back to the port disconnected state (block 405).

Figure 5:
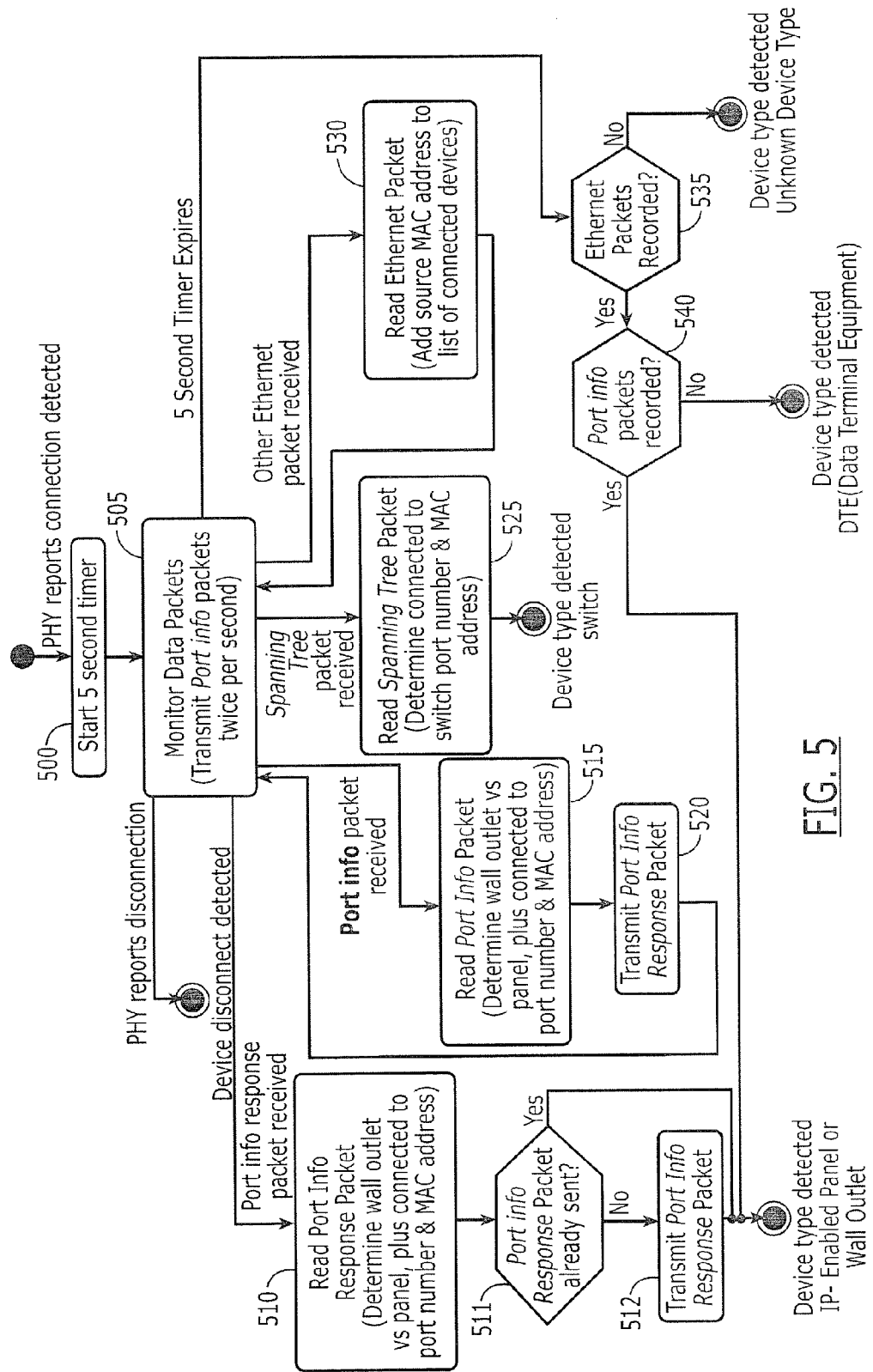

FIG. 5 illustrates a state machine that may be implemented by the controller 115 of FIG. 1 to determine the type of end device that is connected to a local port in accordance with some embodiments of the present invention. When a connection is detected, the controller 115 starts a timer, which may be a 5-second timer in accordance with some embodiments of the present invention, at block 500. The state machine then transitions to block 505 where the controller 115 transmits Port Info packets twice per second through local ports 105/110 and monitors incoming packets at local ports 105/110 (the various types of incoming packets that may be received are discussed in detail below). A Port Info packet is an Internet Protocol (IP) broadcast packet that contains a port's assigned MAC address as the source MAC address and device identification data and port number as part of the data payload. For the case of a patch panel, the identification data includes the rack number, panel number, port number, and any other information that may facilitate locating the panel and port. If a Port Info Response packet is received, then the state machine transitions to block 510 where a determination is made whether the end device connected to the local port is a wall outlet or a patch panel. A Port Info Response packet may be an IP broadcast packet that acknowledges receipt of a Port Info packet. In a Port Info Response packet, the source MAC and destination MAC addresses correspond to the sending and receiving ports, respectively, and the payload is the same as that of the Port Info packet. The controller 115 reports the determined end device type along with the connected to local port number, port number on the end device that the local port is connected to, a physical location of the port on the structured cabling apparatus or device that the end device is connected to, a position of the structured cabling apparatus in a rack or cabinet along with physical location of the rack or cabinet, a physical location of the structured cabling apparatus or device, such as a room number, data center row/column coordinates, GPS coordinates, and/or MAC address to the network monitoring system 145. A received Port Info Response packet at the local device indicates that the far end of a panel-to-panel or panel-to-wall outlet link has processed the near-end device's MAC address, device type and port information. The state machine then transitions to block 511 where a determination is made whether a Port Info Response packet has already been sent. If not, then the state machine transitions to block 512 and a Port Info Response packet is transmitted. This reduces the likelihood that one end of a cable connection does not transmit a Port Info packet, receive a Port Info Response packet, and then terminate the state machine before the other end of the cable connection sends a Port Info packet and gets a response thereto.

If at block 505 a Port Info packet is received, then the state machine transitions from block 505 to block 515 where a determination is made whether the end device connected to the port is a wall outlet or a patch panel. Other layer-one, structured cabling apparatus/devices, such as wall outlets, other patch panels, etc. may exist in the network that include the managed port circuitry in accordance with some embodiments of the present invention. Accordingly, a Port Info packet may be received from any such apparatus/devices that are configured with port management circuitry as described herein and running an instance of the state machine of FIG. 5. The controller 115 reports the determined end device type along with the connected to local port number, port number on the end device that the local port is connected to, a physical location of the port on the structured cabling apparatus or device that the end device is connected to, a position of the structured cabling apparatus in a rack or cabinet along with physical location of the rack or cabinet, a physical location of the structured cabling apparatus or device, such as a room number, data center row/column coordinates, GPS coordinates, and/or MAC address to the network monitoring system 145. The state machine then transitions to block 520 where a Port Info Response packet is transmitted to the determined end device.

At block 505, if a Spanning Tree packet is received, then the state machine transitions from block 505 to block 525. A Spanning Tree packet is a specific type of packet normally transmitted by a network bridge device, such as, for example, a network router or switch. A Spanning Tree packet contains MAC address and/or port connection information from the network bridge. Example Spanning Tree packets include, but are not limited to, Spanning Tree Protocol (STP) packets, Rapid Spanning Tree Protocol (RSTP) packets, Multiple Spanning Tree Protocol (MSTP) packets, Per-VLAN Spanning Tree (PVST) protocol packets, and Rapid Per-VLAN Spanning Tree (R-PVST) protocol packets. If a Spanning Tree packet is received, the controller 115 reports the determined end device is a switch/hub along with the connected to local port number, port number on the end device that the local port is connected to, a physical location of the port on the structured cabling apparatus or device that the end device is connected to, a position of the structured cabling apparatus in a rack or cabinet along with physical location of the rack or cabinet, a physical location of the structured cabling apparatus or device, such as a room number, data center row/column coordinates, GPS coordinates, and/or MAC address. Switches or hubs that do not transmit recognized types of Spanning Tree packets or that transmit Spanning Tree packets at intervals greater than the timer interval used by the state machine may not be detected. In this case, the Data Terminal Equipment (DTE) behind the hub/switch may be detected and reported as the connected to end device.

If an Ethernet packet is received other than a Spanning Tree packet, Port Info packet or Port Info Response packet, then the state machine transitions from block 505 to block 530 where the MAC address is added to a list of connected to end devices and the state machine then transitions back to block 505 to wait for expiration of the timer. Once the timer expires, the state machine transitions from block 505 to block 535 where a determination is made whether any Ethernet packets have been recorded. If not, then the end device type is unknown. If so, then the state machine transitions to block 540 where a determination is made whether any Port Info packets have been recorded. This may be the case, for example, if a Port Info Response packet is received from the end device, but Port Info Response packet is yet to be sent to the end device or a Port Info packet is received from the end device and a Port Info Response packet is yet to be sent to the end device. If not, then the end device type is determined to be DTE. If so, then the end device type is determined to be a patch panel or wall outlet even though the protocol of sending a Port Info packet and receiving a Port Info Response packet in response thereto had not completed for both ends of the connection between the local device and the end device.

As shown in FIG. 5, if the disconnection detection circuit 130a or 130b detects a disconnection at any time while monitoring data packets at block 505, the state machine transitions back to the port disconnected state (block 405) of FIG. 4.

In some embodiments of the present invention, the type of a local device that has managed port circuitry associated therewith may be determined indirectly through an end device that is connected thereto. For example, the controller 115 may transmit packets, such as Port Info packets on local ports 105 and 110. A network bridge device, such as a network switch, router, hub, or other managed device that may be connected to one of the local ports 105 or 110 may record at least a portion of one or more of the packets transmitted from the controller 115. The portion may be, for example, the MAC address information. The network monitoring system 145 may communicate with the end device, e.g., the network bridge device, to determine the local device type that has the managed port circuitry associated therewith and/or the port number for the local port that the end device is connected to.

Figure 6:
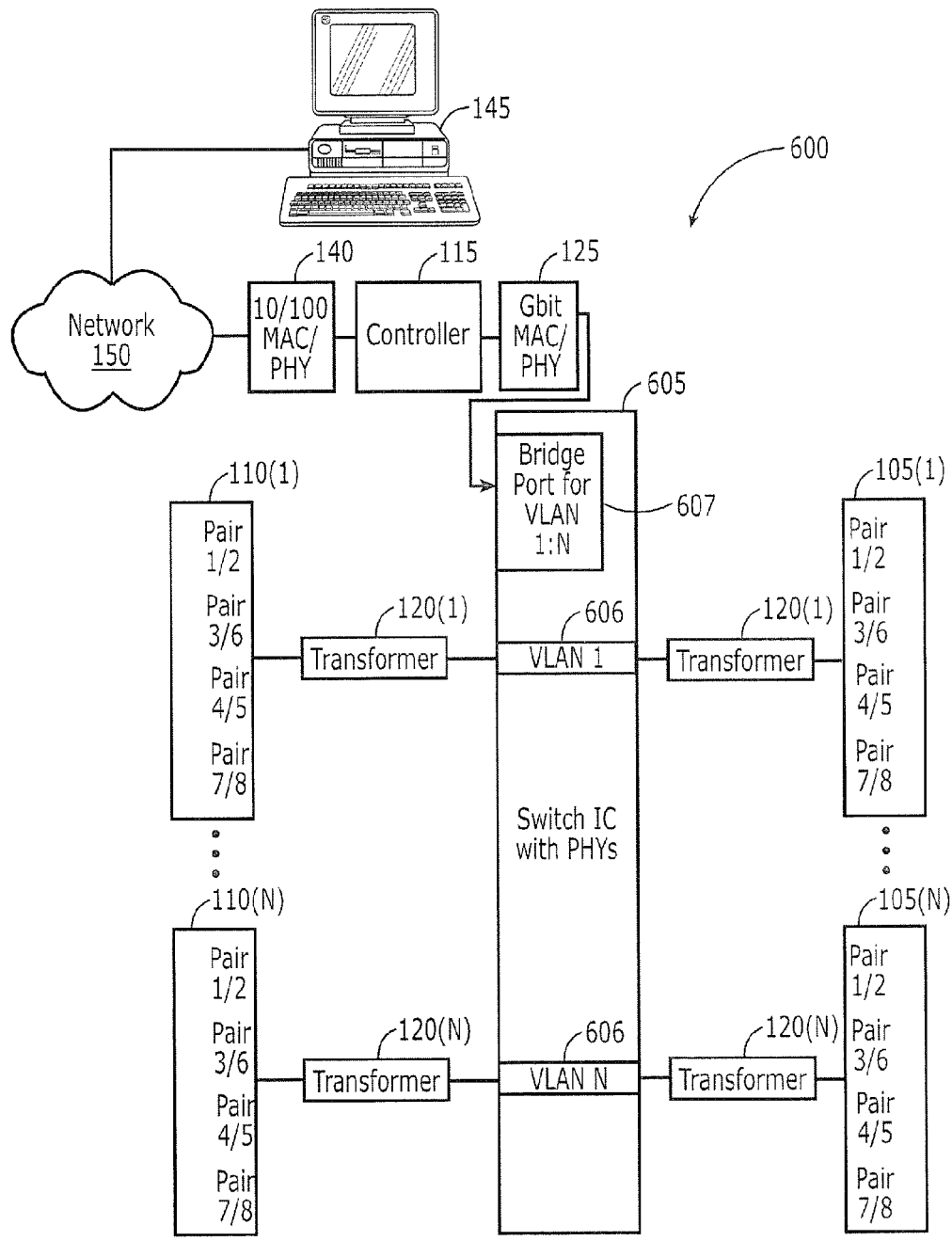
FIG. 6 is a block diagram of a communication network that includes managed port circuitry in accordance with further embodiments of the present invention.

FIG. 6 illustrates a communication network 600 in accordance with further embodiments of the present invention. The communication network 600 is configured similar to that of the communication network 100 of FIG. 1. Instead of using relay circuits A1, A2, B1, and B2 in the channel path, however, the communication network 600 includes a network switch IC 605 that includes integrated PHY circuitry or, in other embodiments, may connect to external network PHY circuits. The network switch IC 605 further includes Virtual Local Area Network (VLAN) technology 606 to switch connections between the pass through configuration in which the local ports 105 and 110 are connected to one another and the detection configuration in which the ports are connected to the controller 115 through a VLAN bridge port 607. Because the PHYs are always present along the data path between the ports 105 and 110, there is no need for additional disconnection detection circuitry 130a and 130b. Each port's PHY may have integrated functionality that detects and reports disconnects through the switch IC 605 to the controller 115.

In other embodiments, the switch IC of FIG. 6 may be configured so that the VLANs 1 through N 606 are always in series with the channel paths connecting the local ports 105 (1-N) with 110(1-N). In this configuration, the VLANs 606 are not switched between a pass through configuration and a detection configuration, but instead may continuously monitor traffic on the channel paths to determine when end devices connect to local port 105(1-N), 110(1-N) and the types of these end devices.

Each VLAN 1-N may comprise a local port 105 (1-N)/110 (1-N) pair. In this way, VLAN technology may be used isolate traffic communicated via the local port pair.

The state machine operations described above with respect to FIG. 4 are also applicable to the communication network embodiments of FIG. 6 with the exception that VLAN technology 606 is used to perform the switching between the port detection configuration and the pass through configuration or VLAN technology 606 is placed in series in the channel paths to continuously monitor the traffic thereon.

The embodiments described above may provide intelligence for physical wiring paths for data center and other operations and may also provide true point-to-point physical connectivity maps to the desktop in enterprise network environments. A network monitoring system may copy all connectivity related information into a database for future use. The network monitoring system may periodically poll the communication network and update the connectivity path to reflect the most up-to-date and as-built condition.

Connectivity patterns may also be tracked for end-user devices based solely on MAC addresses. System Administrators need not be responsible for tracking and documenting changes to their infrastructure. Anytime a physical change is made, that information may be automatically written to the database.

In addition to providing a connectivity map, the network monitoring system may also simplify the mapping of the connectivity map to a data center schematic diagram or in the case of a LAN environment to a floor plan. As data center operations become more consolidated and grow in scale, this functionality may be important for auditing purposes. For example, if a local hospital is undergoing a HIIPA compliance audit, a historical connectivity report may be generated for every device that has ever been plugged into the network (wired or wireless). Embodiments of the present invention may save troubleshooting time, may improve accuracy of topological representations of a communication network, may provide a consistent network mapping structure, and may centralize network mapping functions and administration.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A managed port circuit, comprising:
    a detection circuit that is disposed in a communication channel between a first local port and a second local port; and
    a controller that is coupled to the detection circuit and is operable to configure the detection circuit in a detection configuration in which the first and second local ports, the detection circuit, and the controller are connected in series via the communication channel and a second pass through configuration in which the first and second local ports are connected to each other via the communication channel without the communication channel passing through the controller and the detection circuit, the controller being further operable to determine when an end device is connected to one of the first and second local ports when the detection circuit is in the detection configuration.

2. The managed port circuit of claim 1, further comprising: an interface circuit that connects the detection circuit to the controller and is operable to report end device connections to the first and second local ports to the controller.

3. The managed port circuit of claim 1, further comprising: a disconnection detection circuit that is connected between the controller and the first and second local ports and is operable to report end device disconnections from the first and second local ports to the controller.

4. The managed port circuit of claim 3, wherein the disconnection detection circuit is a differential current sense or voltage sense amplifier circuit.

5. The managed port circuit of claim 1, wherein the detection circuit comprises an electrical relay circuit, an analog switch Integrated Circuit (IC), an optical relay circuit, and/or an electromechanical switch circuit.

6. The managed port circuit of claim 1, wherein the detection circuit comprises a network switch Integrated Circuit (IC).

7. The managed port circuit of claim 6, wherein the first and second local ports are part of a Virtual Local Area Network (VLAN).

8. The managed port circuit of claim 1, wherein the controller is further operable to determine a type of end device connected to one of the first and second local ports, a port number for the first or second local port that the end device is connected to, a port number on the end device that the first or second local port is connected to, a physical location of the first or second local port that the end device is connected to on a local device that is associated with the managed port circuit, a physical location of the local device, connection status of the end device, and/or a Medium Access Control (MAC) address associated with the end device.

9. The managed port circuit of claim 8, wherein the type of end device comprises a patch panel, a zone/cp box, a wall outlet, Data Terminal Equipment (DTE) and/or a network bridge device.

10. The managed port circuit of claim 9, wherein the network bridge device comprises a network switch, router, and/or hub.

11. The managed port circuit of claim 8, wherein the controller is further operable to determine the type of end device by transmitting Port Info packets during an end device detection time interval and determining if a Port Info Response packet is received and/or a Port Info packet is received.

12. The managed port circuit of claim 11, wherein the controller is further operable to determine that the end device type is a wall outlet or patch panel when a Port Info packet or Port Info Response packet is received.

13. The managed port circuit of claim 8, wherein the controller is further operable to determine the type of end device by determining if a Spanning Tree packet is received and/or an Ethernet packet is received other than a Spanning Tree packet.

14. The managed port circuit of claim 13, wherein the controller is further operable to determine that the end device is a network bridge device if the Spanning Tree packet is received.

15. The managed port circuit of claim 13, wherein the Spanning Tree packet comprises a Spanning Tree Protocol (STP) packet, Rapid Spanning Tree Protocol (RSTP) packet, Multiple Spanning Tree Protocol (MSTP) packet, Per-VLAN Spanning Tree (PVST) protocol packet, and/or Rapid Per-VLAN Spanning Tree (R-PVST) protocol packet.

16. The managed port circuit of claim 8, wherein the controller is further operable to configure the detection circuit in the pass through configuration after determining the types of devices connected to the first and second local ports.

17. The managed port circuit of claim 8, wherein the controller is further configured to communicate the type of end device connected to one of the first and second local ports, the port number for the first or second local port that the end device is connected to, the physical location of the first or second local port that the end device is connected to on a local device that is associated with the managed port circuit, the physical location of the local device, connection status of the end device, and/or the Medium Access Control (MAC) address associated with the end device to a network monitoring system.

18. The managed port circuit of claim 1, wherein the detection circuit is disposed in a patch panel, zone/cp box, or wall outlet.

19. The managed port circuit of claim 18, wherein the controller is disposed in the patch panel, zone/cp box, or wall outlet.

20. The managed port circuit of claim 1, wherein a communication medium connecting the end device to one of the first and second local ports lacks a dedicated connectivity control channel.

21. The managed port circuit of claim 20, wherein the communication channel comprises an electrical cable including four wire pairs.

22. The managed port circuit of claim 20, wherein the communication channel comprises a plurality of optical fibers.

23. A method of operating a communication network, comprising:
providing a detection circuit in a communication channel between a first local port and a second local port;
configuring the detection circuit in a detection configuration in which the first local port is connected to the second local port via a controller and the detection circuit such that the first and second local ports, the detection circuit, and the controller are connected in series, the controller being configured to determine when the first and second local ports have end devices connected thereto; and
configuring the detection circuit in a pass through configuration in which the first and second local ports are connected to each other without the controller and the detection circuit after the controller determines that the first and second local ports have end devices connected thereto.

24. The method of claim 23, further comprising:
determining at the controller a type of end device connected to one of the first and second local ports, a port number for the first or second local port that the end device is connected to, a port number on the end device that the first or second local port is connected to, a physical location of the first or second local port that the end device is connected to on a local device that is associated with the managed port circuit, a physical location of the local device, connection status of the end device, and/or a Medium Access Control (MAC) address associated with the end device.

25. The method of claim 24, wherein the type of end device comprises a patch panel, a zone/cp box, a wall outlet, Data Terminal Equipment (DTE) and/or a network bridge device.

26. The method of claim 25, wherein the network bridge device comprises a network switch, router, and/or hub.

27. The method of claim 25, further comprising:
transmitting Port Info packets from the controller to the first and second local ports during an end device detection time interval; and
determining at the controller if a Port Info Response packet is received and/or a Port Info packet is received.

28. The method of claim 27, further comprising:
determining at the controller that the end device type is a wall outlet or patch panel when a Port Info packet or Port Info Response packet is received.

29. The method of claim 25, further comprising:
determining at the controller if a Spanning Tree packet is received and/or an Ethernet packet is received other than a Spanning Tree packet.

30. The method of claim 29, further comprising:
determining at the controller that the end device type is a network bridge device if the Spanning Tree packet is received.

31. The method of claim 29, wherein the Spanning Tree packet comprises a Spanning Tree Protocol (STP) packet, Rapid Spanning Tree Protocol (RSTP) packet, Multiple Spanning Tree Protocol (MSTP) packet, Per-VLAN Spanning Tree (PVST) protocol packet, and/or Rapid Per-VLAN Spanning Tree (R-PVST) protocol packet.

32. The method of claim 24, further comprising:
communicating the type of end device connected to one of the first and second local ports, the port number for the first or second local port that the end device is connected to, the physical location of the first or second local port that the end device is connected to on a local device that is associated with the managed port circuit, the physical location of the local device, connection status of the end device, and/or the Medium Access Control (MAC) address associated with the end device to a network monitoring system.

33. A managed port circuit, comprising:
a detection circuit; and
a controller that is coupled to the detection circuit and is operable to switch the detection circuit between a detection configuration in which a first local port is connected to a second local port via the detection circuit and the controller to monitor traffic on the communication channel and to determine when an end device is connected to one of the first and second local ports such that the first and second local ports, the detection circuit and the controller are connected in series via a communication channel and a pass through configuration in which the first and second local ports are connected to each other without the controller and the detection circuit.

34. The managed port circuit of claim 33, wherein the detection circuit comprises a network switch Integrated Circuit (IC).

35. The managed port circuit of claim 34, wherein the first and second local ports are part of a Virtual Local Area Network (VLAN).

36. The managed port circuit of claim 33, wherein the controller is further operable to determine a type of end device connected to one of the first and second local ports, a port number for the first or second local port that the end device is connected to, a port number on the end device that the first or second local port is connected to, a physical location of the first or second local port that the end device is connected to on a local device that is associated with the managed port circuit, a physical location of the local device, connection status of the end device, and/or a Medium Access Control (MAC) address associated with the end device.

37. The managed port circuit of claim 36, wherein the type of end device comprises a patch panel, a zone/cp box, a wall outlet, Data Terminal Equipment (DTE) and/or a network bridge device.

38. The managed port circuit of claim 37, wherein the network bridge device comprises a network switch, router, and/or hub.

39. The managed port circuit of claim 36, wherein the controller is further operable to determine the type of end device by transmitting Port Info packets during an end device detection time interval and determining if a Port Info Response packet is received and/or a Port Info packet is received.

40. The managed port circuit of claim 39, wherein the controller is further operable to determine that the end device type is a wall outlet or patch panel when a Port Info packet or Port Info Response packet is received.

41. The managed port circuit of claim 36, wherein the controller is further operable to determine the type of end device by determining if a Spanning Tree packet is received and/or an Ethernet packet is received other than a Spanning Tree packet.

42. The managed port circuit of claim 41, wherein the controller is further operable to determine that the end device is a network bridge device if the Spanning Tree packet is received.

43. The managed port circuit of claim 42, wherein the Spanning Tree packet comprises a Spanning Tree Protocol (STP) packet, Rapid Spanning Tree Protocol (RSTP) packet, Multiple Spanning Tree Protocol (MSTP) packet, Per-VLAN Spanning Tree (PVST) protocol packet, and/or Rapid Per-VLAN Spanning Tree (R-PVST) protocol packet.

44. The managed port circuit of claim 36, wherein the controller is further configured to communicate the type of end device connected to one of the first and second local ports, the port number for the first or second local port that the end device is connected to, the physical location of the first or second local port that the end device is connected to on a local device that is associated with the managed port circuit, the physical location of the local device, connection status of the end device, and/or the Medium Access Control (MAC) address associated with the end device to a network monitoring system.

45. The managed port circuit of claim 33, wherein the detection circuit is disposed in a patch panel, zone/cp box, or wall outlet.

46. The managed port circuit of claim 45, wherein the controller is disposed in the patch panel, zone/cp box, or wall outlet.

47. The managed port circuit of claim 33, wherein a communication medium connecting the end device to one of the first and second local ports lacks a dedicated connectivity control channel.

48. The managed port circuit of claim 47, wherein the communication channel comprises an electrical cable including four wire pairs.

49. The managed port circuit of claim 47, wherein the communication channel comprises a plurality of optical fibers.

50. A method of operating a communication network, comprising:
providing a detection circuit; and monitoring traffic on the communication channel via a controller that is coupled to the detection circuit and is operable to switch the detection circuit between a detection configuration in which a first local port is connected to a second local port via the detection circuit and the controller to determine when an end device is connected to one of the first and second local ports such that the first and second local ports, the detection circuit and the controller are connected in series via a communication channel and a pass through configuration in which the first and second local ports are connected to each other without the controller and the detection circuit.

51. The method of claim 50, further comprising:
determining at the controller a type of end device connected to one of the first and second local ports, a port number for the first or second local port that the end device is connected to, a port number on the end device that the first or second local port is connected to, a physical location of the first or second local port that the end device is connected to on a local device that is associated with the managed port circuit, a physical location of the local device, connection status of the end device, and/or a Medium Access Control (MAC) address associated with the end device.

52. The method of claim 51, wherein the type of end device comprises a patch panel, a zone/cp box, a wall outlet, Data Terminal Equipment (DTE) and/or a network bridge device.

53. The method of claim 52, wherein the network bridge device comprises a network switch, router, and/or hub.

54. The method of claim 52, further comprising:
transmitting Port Info packets from the controller to the first and second local ports during an end device detection time interval; and determining at the controller if a Port Info Response packet is received and/or a Port Info packet is received.

55. The method of claim 54, further comprising:
determining at the controller that the end device type is a wall outlet or patch panel when a Port Info packet or Port Info Response packet is received.

56. The method of claim 52, further comprising:
determining at the controller if a Spanning Tree packet is received and/or an Ethernet packet is received other than a Spanning Tree packet.

57. The method of claim 56, further comprising:
determining at the controller that the end device type is a network bridge device if the Spanning Tree packet is received.

58. The method of claim 56, wherein the Spanning Tree packet comprises a Spanning Tree Protocol (STP) packet, Rapid Spanning Tree Protocol (RSTP) packet, Multiple Spanning Tree Protocol (MSTP) packet, Per-VLAN Spanning Tree (PVST) protocol packet, and/or Rapid Per-VLAN Spanning Tree (R-PVST) protocol packet.

59. The method of claim 51, further comprising:
communicating the type of end device connected to one of the first and second local ports, the port number for the first or second local port that the end device is connected to, the physical location of the first or second local port that the end device is connected to on a local device that is associated with the managed port circuit, the physical location of the local device, connection status of the end device, and/or the Medium Access Control (MAC) address associated with the end device to a network monitoring system.

* * * * *